Dec. 22, 1931.  J. C. AGAR  1,837,514
METHOD FOR TREATING FOOD CARCASSES
Filed Aug. 14, 1929 7 Sheets-Sheet 4
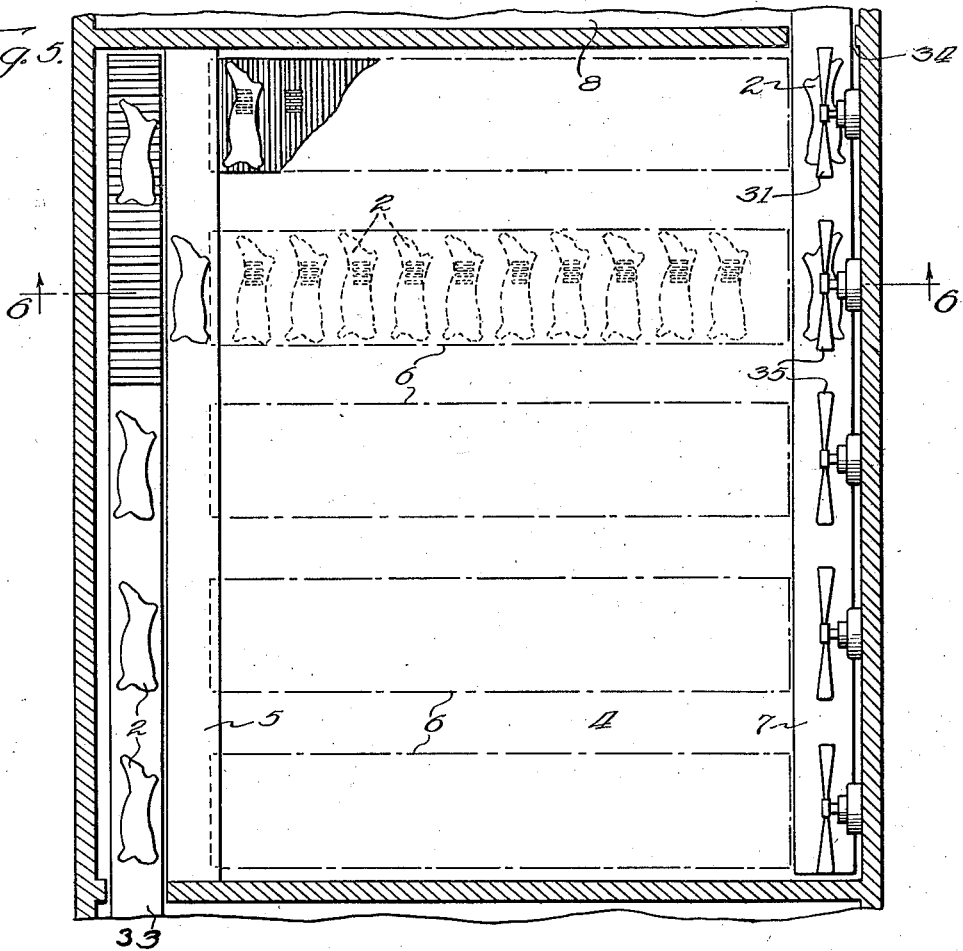
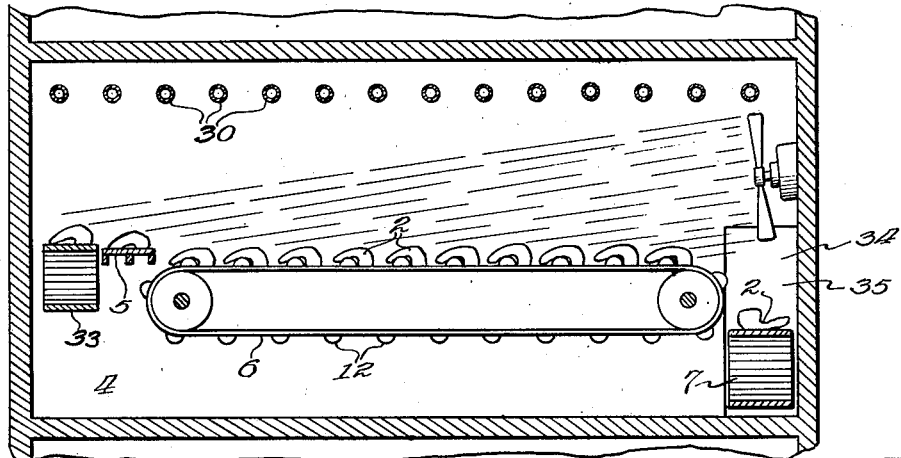

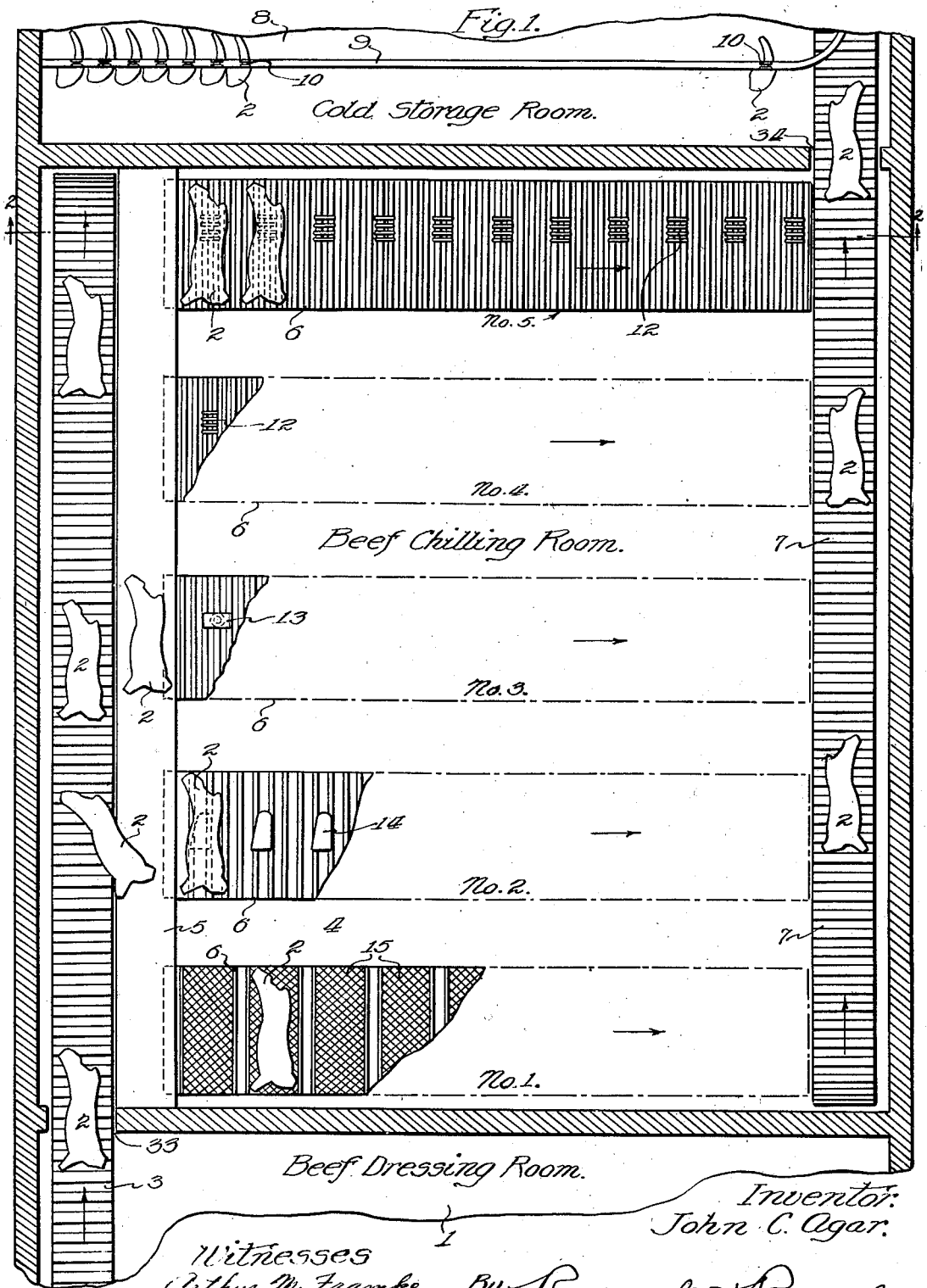

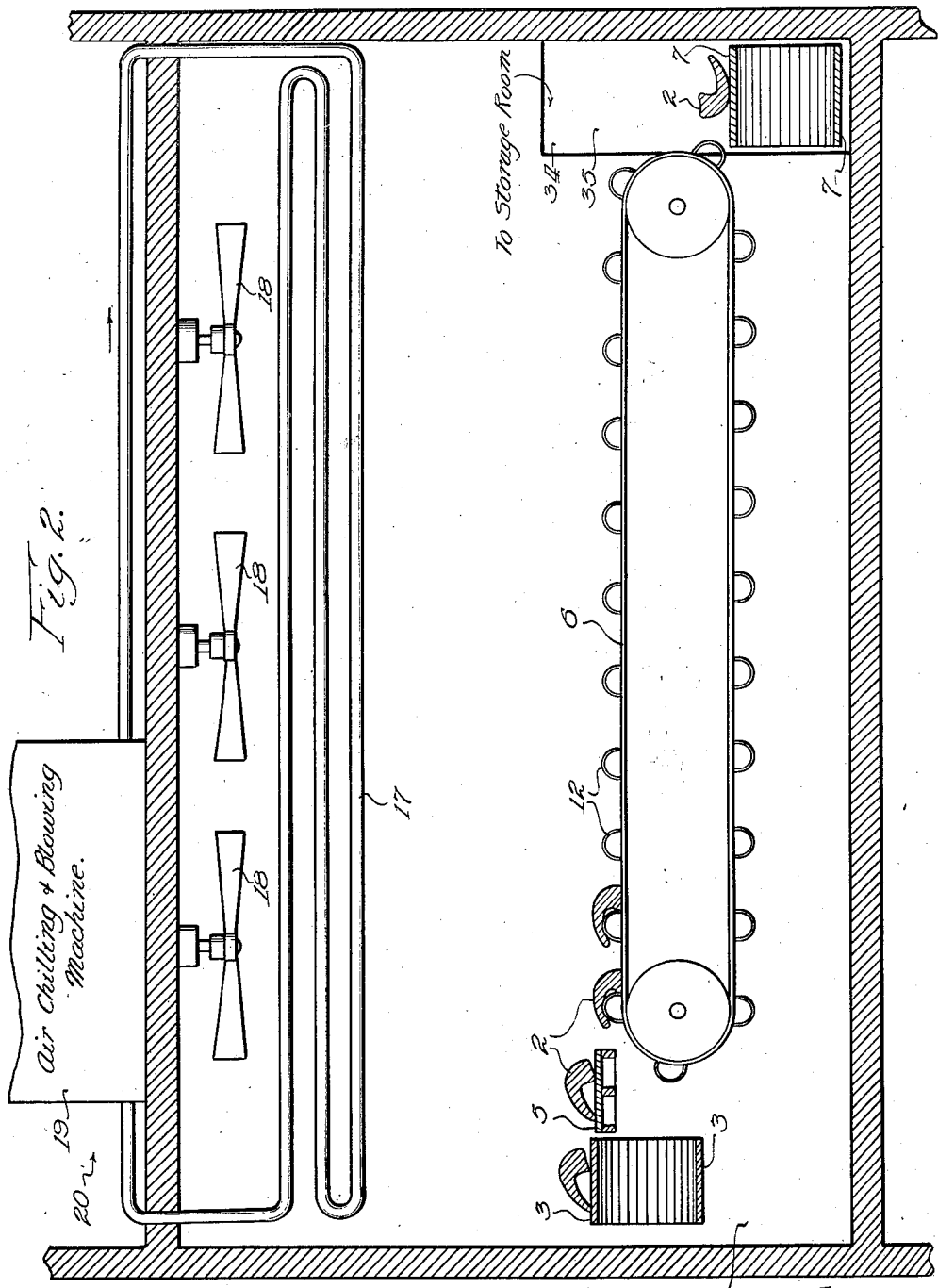

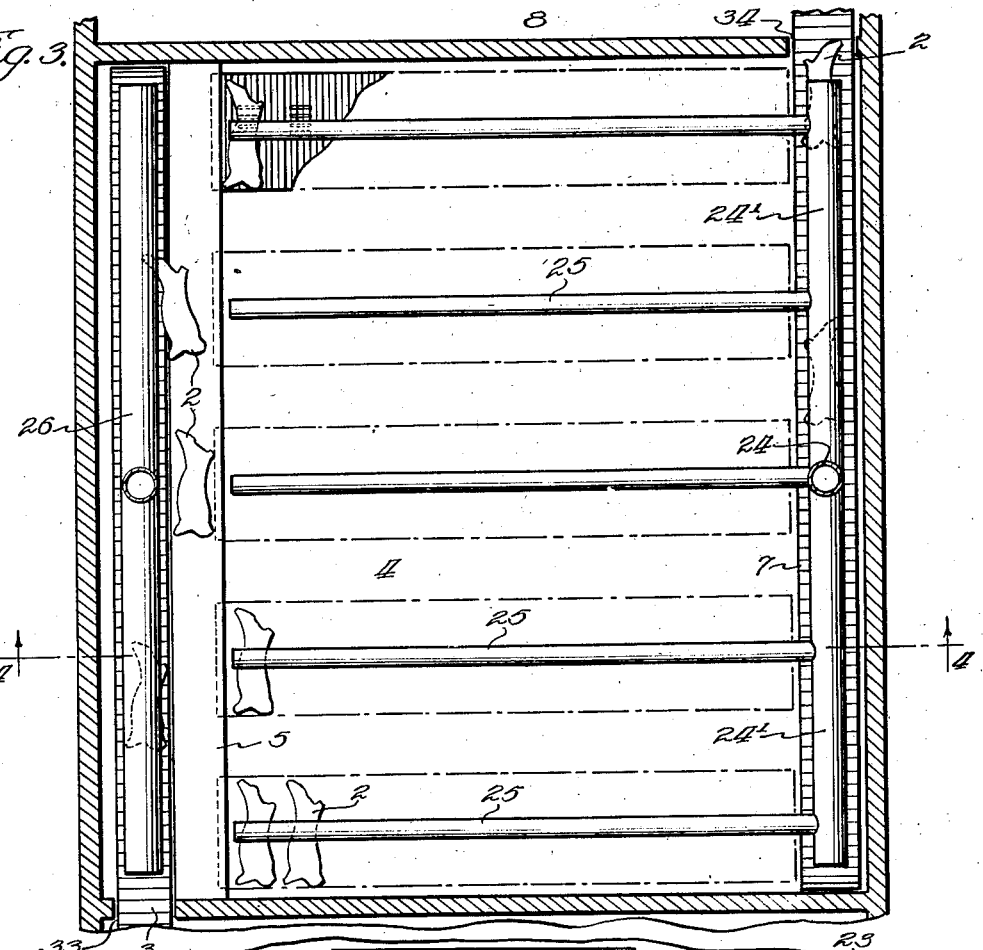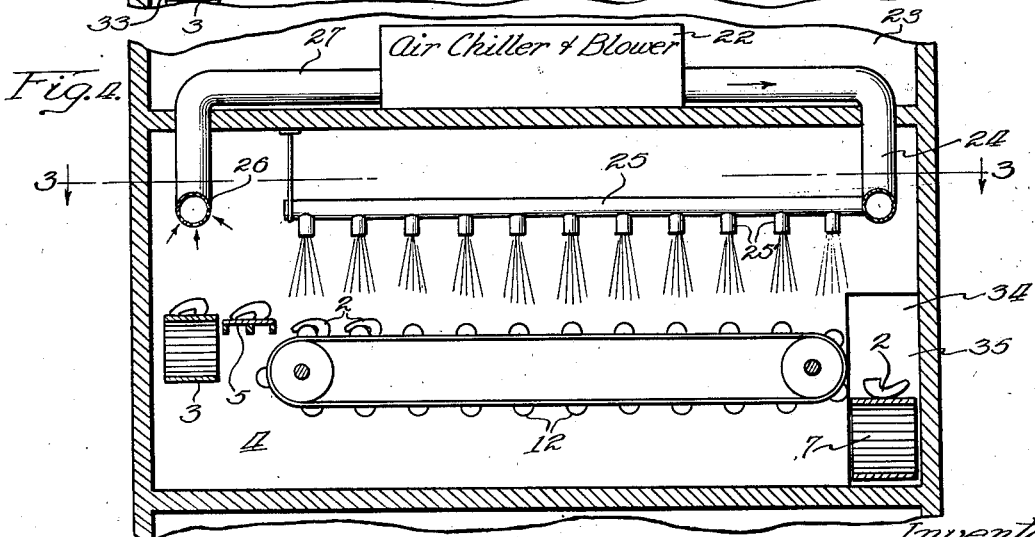

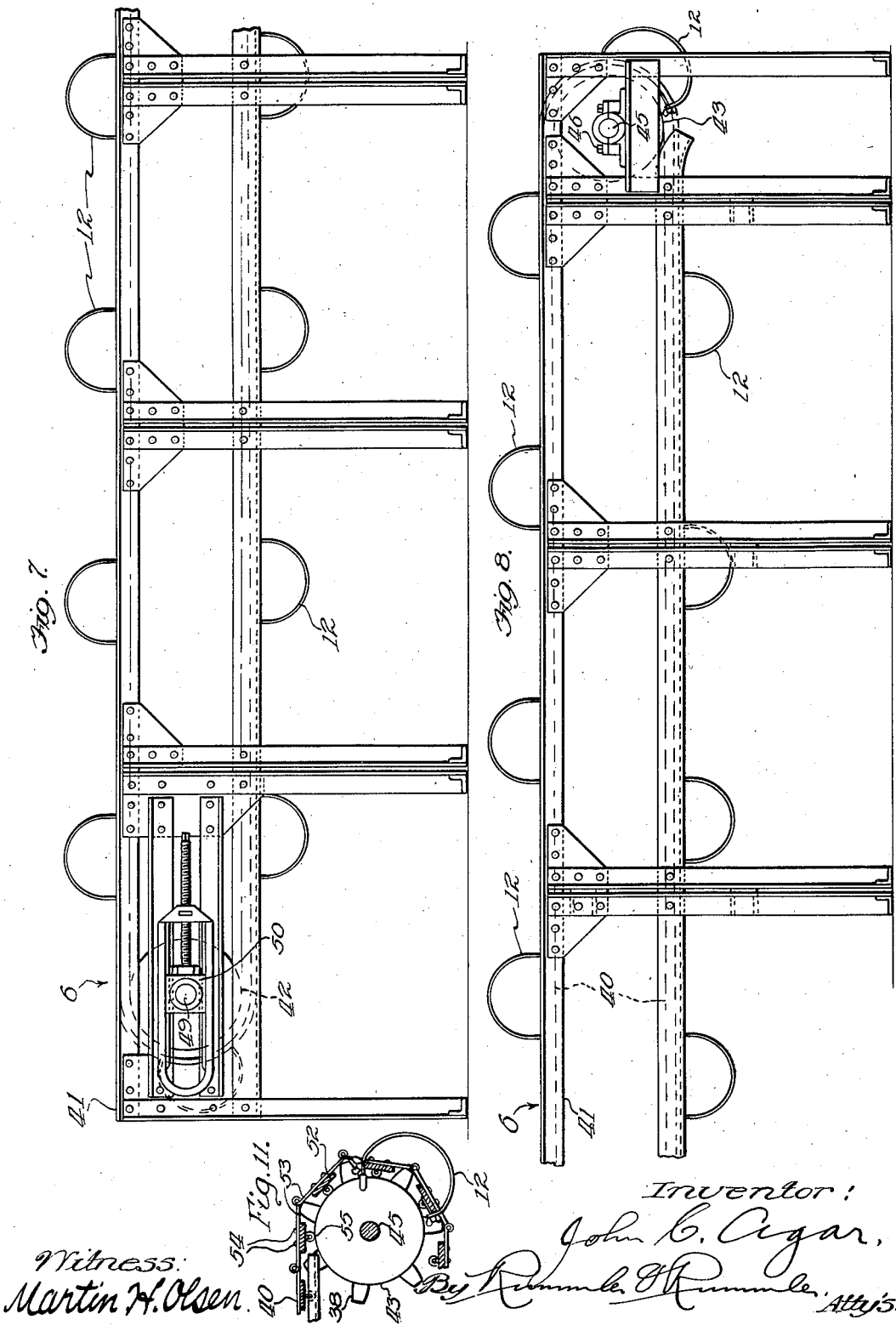

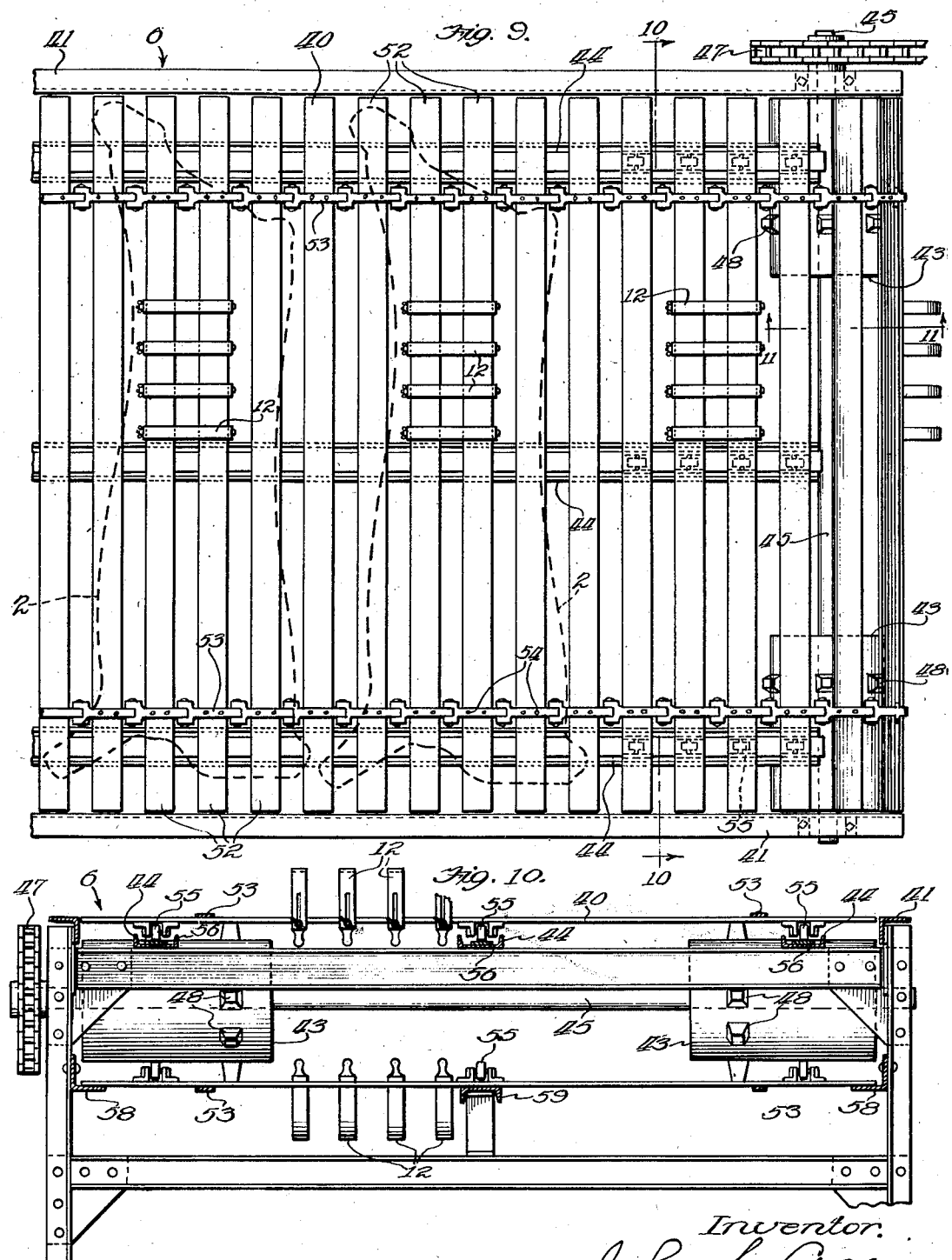

Dec. 22, 1931.     J. C. AGAR     1,837,514
METHOD FOR TREATING FOOD CARCASSES
Filed Aug. 14, 1929    7 Sheets-Sheet 7
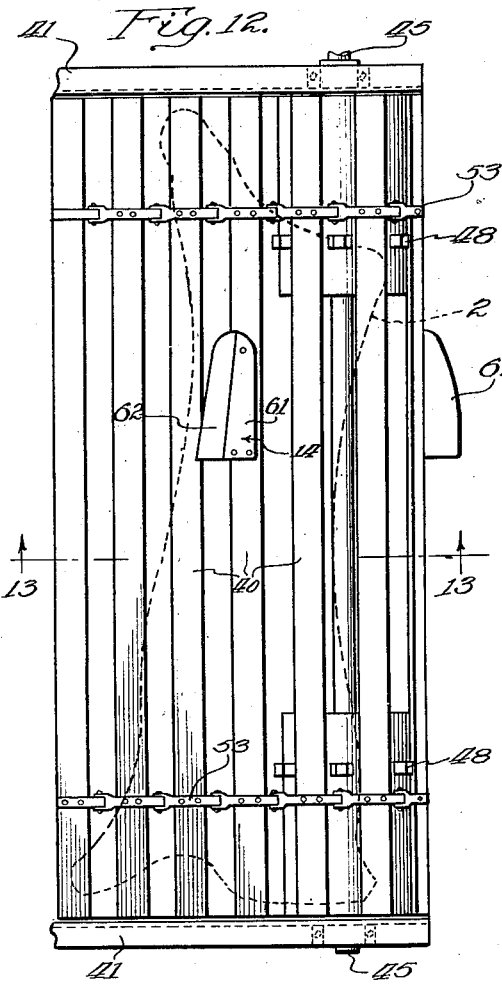
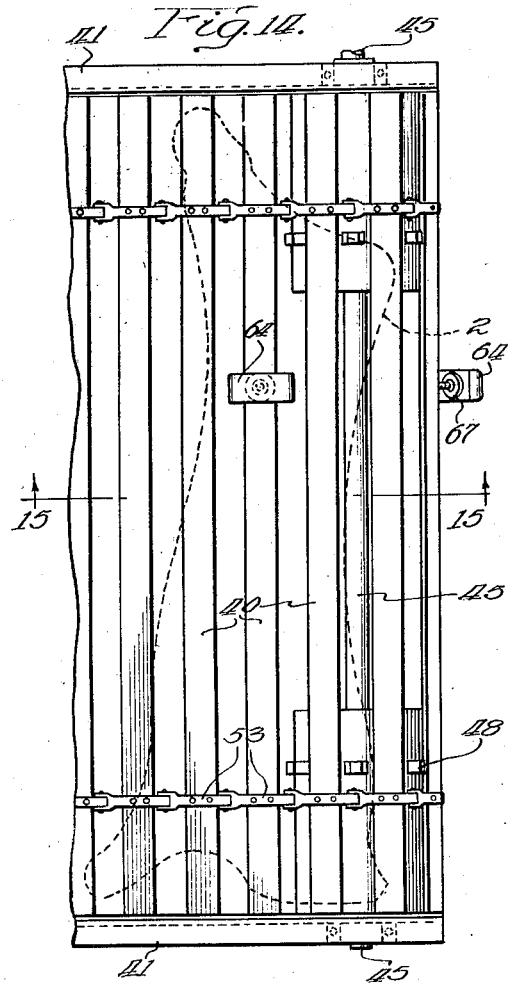
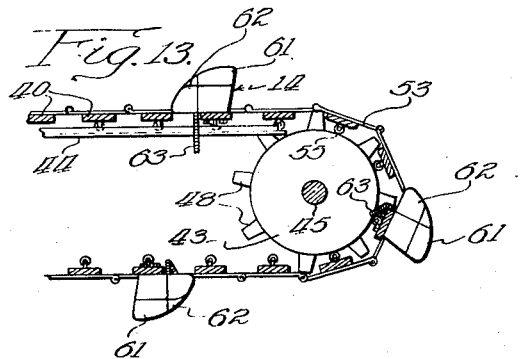
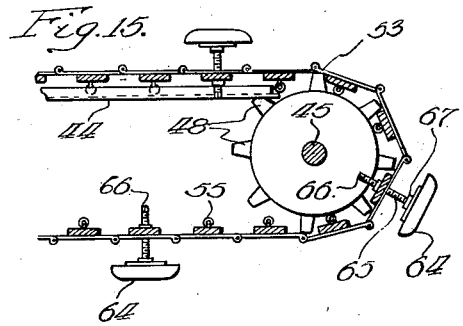
Witnesses
Arthur M. Franke.
Fred M. Davis
Inventor:
John C. Agar.
By Rummler any Rummler
Attys:

Patented Dec. 22, 1931

1,837,514

UNITED STATES PATENT OFFICE

JOHN C. AGAR, OF CHICAGO, ILLINOIS, ASSIGNOR TO SWIFT AND COMPANY, OF CHICAGO, ILLINOIS, A CORPORATION OF ILLINOIS

METHOD FOR TREATING FOOD CARCASSES

Application filed August 14, 1929. Serial No. 385,763.

This invention relates to the packing industry, and especially to continuous process methods and means adapted for the convenient handling and prompt chilling of animal carcasses in large quantities after dressing; reference being had mainly to sides of beef, but not excluding other carcasses and carcass parts.

The main objects of the invention are to provide an improved method and means for handling and treating the carcass or carcass parts during the chilling operation; to provide for submitting the meat or carcass parts in a most efficient and quickly effective manner to a refrigerated atmosphere conditioned to effect the desired chilling of the meat and setting of the muscles; to provide for positively directing rapid drafts of chilled air directly against the carcass or parts to be chilled; to provide means adapted for rendering the chilling process continuous for an indefinite period and for any desired succession of carcasses; to embody in such a system of apparatus an organization of continuously moving conveyors arranged in a chilling room, where so combined and subjected to speed condition and control as to assure effective chilling of the meat during its passage over and upon such conveyors and through such room; to provide for adjustably supporting the flaccid warm meat in any desired form or shape on the chilling conveyers, so that a desired form or set shall be attained by the product in the chilling process; and to provide an improved form of endless conveyer adapted especially for the chilling process herein set forth.

An illustrative embodiment of this invention is shown by the accompanying drawings in which:

Fig. 1 is a general floor plan view of that part of a packing house in which the invention is practiced, the apparatus being shown in rather conventional form.

Fig. 2 is a vertical section on the line 2—2 of Fig. 1, and shows one of the chilling conveyors in its relation to one form of air chilling and circulating means.

Fig. 3 is a fragmentary plan taken in section on the line 3—3 of Fig. 4 and shows substantially the same conveyor system as shown in Fig. 1, in combination with a modified form of chilled air distributing and circulating system.

Fig. 4 is a vertical section on the line 4—4 of Fig. 3.

Fig. 5 is a plan substantially similar to Fig. 3 except that a modified form of air circulating means is shown.

Fig. 6 is a vertical section on the line 6—6 of Fig. 5.

Fig. 7 is a side view of the left hand part of the receiving end of a chilling conveyor such as shown in Figs. 1 and 2, and shows actual structure as distinct from the conventional representation of said figures.

Fig. 8 is complementary to Fig. 7, and shows the right-hand part or discharge end of the conveyor.

Fig. 9 is a plan of the conveyor part shown in Fig. 8, sides of beef being shown in dotted outline.

Fig. 10 is a vertical section on the line 10—10 of Fig. 9.

Fig. 11 is a fragmentary vertical section on the line 11—11 of Fig. 9.

Fig. 12 is a plan of a conveyor such as shown by Fig. 9 except that "filler blocks" are used instead of bow members to support the beef flanks.

Fig. 13 is a section taken about as in Fig. 11, but showing the filler-blocks of Fig. 12.

Fig. 14 is a plan similar to Fig. 12, except that screw-jacks are shown instead of filler blocks.

Fig. 15 is a section similar to Fig. 13, but shows screw-jacks instead of filler-blocks.

Referring first to Fig. 1, this view shows the system as a whole. It discloses certain convenient and effective means and also appropriate routing for the complete chilling process, as will be apparent especially when considered in connection with Fig. 2. From the beef dressing room 1, the sides of beef 2 are carried in continuous succession on an endless conveyor 3 into the adjacent chilling room 4. Here the beef is transferred in any convenient or desired manner from the conveyor 3, manually if desired, to a stationary distributing platform 5, from which workmen, not shown, feed the sides of beef in multiple series movement over onto the transversely disposed slow motion conveyors 6. In this room 4, which is kept preferably at a temperature of zero to five degrees Fahrenheit, the meat is speedily air-chilled, as will be explained, and so caused to set. The chilled meat is thence delivered to a collecting and discharge conveyor 7 which is sufficiently lower than the conveyors 6 to assure automatic gravity transfer without manual aid. This is best shown by Fig. 2. The conveyor 6 takes the chilled meat promptly to the cold storage room 8, preferably next adjacent to room 4 and on the same level.

This room 8 is provided with a distributive set of overhead trolley rails 9, such as are used extensively in packing houses for supporting and guiding truck units such as indicated by numeral 10. As fast as the chilled sides arrive in this room 8 they are caught up on trolley supported gambrel hooks and suspended endwise, thus enabling ready handling on the trucks 10 and compact storage when arranged side by side throughout the room, as will be understood.

In order to facilitate supporting and forming the flank parts of the sides of beef in any desired manner, variously shaped "forms" or "molds" mainly of adjustable and interchangeable character are provided, adapted for attachment to the chilling conveyors 6 in due relation to the flanks. One of the most effective flank holders is shown on conveyor "No. 4" of Fig. 1, where bowed strips 12 are used. On conveyor No. 3 screw lift forms 13 are used. On conveyor No. 2 are adjustable filler blocks 14. And on conveyor No. 1 hammock-like forms 15 are mounted side by side to receive the sides of beef. Any preferred form of these or similar supports may be used in any specific installation, or as one may see, any desired group or assortment according to local needs.

For more specific details as to structure and operation of these various flank supports or mold forms, reference may be had to the following copending applications now owned by the present assignee, namely; form 12, Serial No. 310,864; form 13, Patent No. 1,721,139; form 14, Patent No. 1,757,070, and form 15, Serial No. 310,864. Of present main significance is the fact that this form of conveyor system lends itself flexibly to the various conditions and needs of beef chilling.

Referring now to Fig. 2, the air chilling and circulating system, here shown at the top, comprises an overhead heat transfer device, including a set of air chilling tubes or coils 17 in combination with a group of downwardly facing fans 18 for driving the chilled air directly against the meat 2 on the conveyors 6. The coils 17 lead upward to an air chilling and circulating machine 19 in the room 20, above. A coil 17 and a set of fans 18 may well be arranged over each conveyor 6, as will be apparent. So-called air-plane type fans are best adapted to produce the high speed drafts desired.

Referring next to Figs. 3 and 4 the conveyor system is substantially like that shown in Figs. 1 and 2, but a modified system of apparatus is shown for circulation of the chilled air. Here the air which is chilled and placed under pressure by the machine 22 in the room 23 is conducted through a main pipe 24 to the chilling room 4 where is connected a header pipe 24' and where branch discharge pipes 25 extend horizontally over the several chilling conveyors 6 respectively. Each of said pipes 25 is provided with a series of downwardly facing discharge nozzles 25' which direct the air forcibly against the meat on conveyors. From the room 4 the used air is drawn by suction into the collecting pipe 26 which extends preferably over the conveyor 3, which tube discharges through an upwardly extending tube 27 leading to the machine 22 for rechilling. The process is thus continuous.

The air control equipment shown by Figs. 5 and 6 comprises a set of overhead air chilling pipes 30 and a series of high speed wall fans 31 disposed to throw a draft of air diagonally downward and lengthwise of the several conveyors 6 respectively. The pipes 30 may be chilled in any manner desired, as for instance by means of cold brine circulating therein, or by means of a fluid changing from a liquid to a gas therein. A fan speed of 1800 R. P. M. with airplane style propellers is found to be very satisfactory.

The chilling room inlet 33 and outlet 34 through which the conveyors 3 and 7 operate respectively may well be provided with yielding closures 35, as for instance canvas curtains hung from the top.

Whenever desirable, as in rush seasons, the chilling process may be maintained substantially continuous, the conveyors 6 being so speeded that the meat will be fully chilled when it reaches the discharge end, so that as fast as meat is loaded on at one end it is discharged at the other end. The necessary chilling period varies somewhat, depending on the temperature of the air, the speed of the fans and the size of the carcass parts.

Ordinarily sides of beef require only about three hours, instead of twenty as formerly.

Although I have shown sides of beef in the drawings, it is to be understood that the system as a whole is well adapted for continuous process quick chilling of all kinds of packing house products, including fancy meats, liver, brains, etc.

The chilling conveyors proper, designated 6 on Fig. 1, will now be described, reference being had mainly to Figs. 7 to 15 for details. A flexible band style of flank support is shown on the conveyors of Figs. 7 to 11, whereas an adjustable block style appears on Figs. 12 and 13 and a screw jack style appears on Figs. 14 and 15.

The conveyor 6 comprises mainly an endless belt style of carrying member 40, an oblong frame 41, end rolls 42 and 43, and guide rails 44 for the carrier 40. The roll 43 has a shaft 45 carried on stationary journal bearings 46. This shaft has a driving gear 47 and the roll 43 has teeth 48 to engage the carrier 40. Shaft 45 may be driven from any desired source of power, e. g., a motor, not shown, and as will be understood any sort of reducing gear may be used.

The shaft 49 for roll 42 has screw adjustable bearings 50, so that the best working tension for carrier 40 may easily be maintained. This carrier comprises mainly a series of cross slats 52 and a pair of lateral chains 53, the latter having its successive links attached to corresponding slats respectively, as by rivets 54. Each slat 52 has three inward rollers 55 distributed centrally and near the ends, to minimize friction.

The frame 40 has three upwardly facing longitudinal tracks 56 for the rollers 55 on the loaded part of the belt, and plain slideway strips including angles 58 and channel 59 for the unloaded returning part of the belt.

The flank supporting bows or slats 13 are such as shown on Fig. 1. These bows are mounted much as in said application, Serial No. 310,864. Their flexibility accommodate the necessary self-adjustment at the ends of the conveyors, as shown by Fig. 11.

Referring to the modification of Figs. 12 and 13, adjustable blocks 14 are here secured to the carrier, instead of bow slats 12. Here the blocks are in two parts 61 and 62, substantially as in Patent No. 1,757,070.

One part 61 is secured to a carrier slat 52 and part 62 is carried directly by part 61, so as to accommodate movement around the end rolls 42 and 43 as in Fig. 13. The block adjusting chain is indicated at 63.

The screw-jack equipment of Figs. 14 and 15 provides for jacks 13 in place of bow strips 12 or blocks 14. Each jack is screw mounted in one of the conveyer slats 52, and comprises a bearing plate 64 and a threaded shaft 65 substantially such as shown in application Serial No. 310,876, except that the free end of the screw is formed at 66 to receive a wrench and the other end is swiveled at 67 to plate 64.

These various forms of flank supports merely illustrate means to help hold the meat in its natural, relaxed and best appearing state while it is being chilled and set. Except for the hammock or cradle style of support, all of those shown receive the beef bone-side down, as will be apparent.

Quick removal of the animal heat and holding at 45° to 55° is sufficient to preclude bacterial action and the meat stays rigid. Much lower temperatures may be attained whenever desired, by slowing down the speed of conveyors 6, or by letting them stand at times when work conditions permit.

Although certain specific embodiments of this invention and their mode of use have been selected to illustrate my improvements herein set forth, it is to be understood that some of the details may be altered or omitted without departing from the spirit of this invention as defined by the following claim.

I claim:

The industrial process of preparing animal carcasses for market, with minimized anatomical distortion, which consists in butchering the animals to the extent of splitting in halves, then while still warm and flaccid laying the halves recumbently in substantially their natural shape, and while thus disposed moving the same slowly and in continuous succession through a chilling room, subjecting them to a draft of chilled air during this movement and thereby chilling and setting the same by operation of heat radiation, and finally suspending the rigidified halves endwise for storage.

Signed at Chicago this 9th day of August, 1929.

JOHN C. AGAR.